United States Patent
Stewart

(10) Patent No.: US 9,479,008 B2
(45) Date of Patent: Oct. 25, 2016

(54) MOBILE DEVICE WIRELESS CHARGING SYSTEM

(71) Applicant: Douglas Anthony Stewart, Las Vegas, NV (US)

(72) Inventor: Douglas Anthony Stewart, Las Vegas, NV (US)

( * ) Notice: Subject to any disclaimer, the term of this patent is extended or adjusted under 35 U.S.C. 154(b) by 224 days.

(21) Appl. No.: 14/490,567

(22) Filed: Sep. 18, 2014

(65) Prior Publication Data

US 2016/0087478 A1    Mar. 24, 2016

(51) Int. Cl.
| | |
|---|---|
| *H02J 7/00* | (2006.01) |
| *G06K 7/10* | (2006.01) |
| *H02J 7/02* | (2016.01) |
| *G06K 19/16* | (2006.01) |
| *H02J 7/34* | (2006.01) |

(52) U.S. Cl.
CPC ............ *H02J 7/025* (2013.01); *G06K 19/16* (2013.01); *H02J 7/0052* (2013.01); *G06K 7/10722* (2013.01); *H02J 7/345* (2013.01)

(58) Field of Classification Search
CPC ....... H02J 7/025; H02J 7/0052; G06K 19/16
USPC ................. 320/108, 166; 307/104; 455/573; 235/454, 457
See application file for complete search history.

(56) References Cited

U.S. PATENT DOCUMENTS

| | | | | |
|---|---|---|---|---|
| 4,159,417 | A * | 6/1979 | Rubincam | G03H 1/30 235/375 |
| 4,820,006 | A * | 4/1989 | Constant | G06K 19/16 235/457 |
| 7,948,208 | B2 * | 5/2011 | Partovi | H02J 7/0027 320/108 |
| 8,872,386 | B2 * | 10/2014 | Mach | H02J 5/00 307/104 |
| 2003/0042303 | A1 * | 3/2003 | Tsikos | G06K 7/10594 235/384 |
| 2006/0086794 | A1 * | 4/2006 | Knowles | G02B 26/10 235/454 |

* cited by examiner

*Primary Examiner* — M'Baye Diao

(57) ABSTRACT

A wireless charging system for charging a mobile device uses a supercapacitor to provide wireless charging of the device. A holographic image of the supercapacitor may store electrical charge which may be released for storage into the battery of the device.

10 Claims, 4 Drawing Sheets

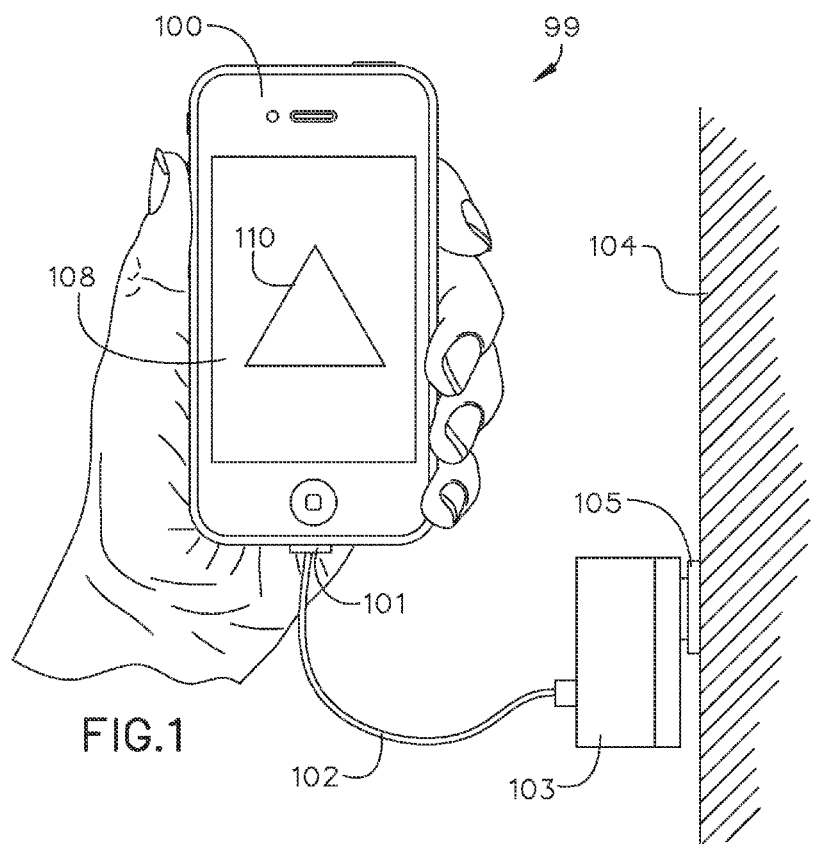
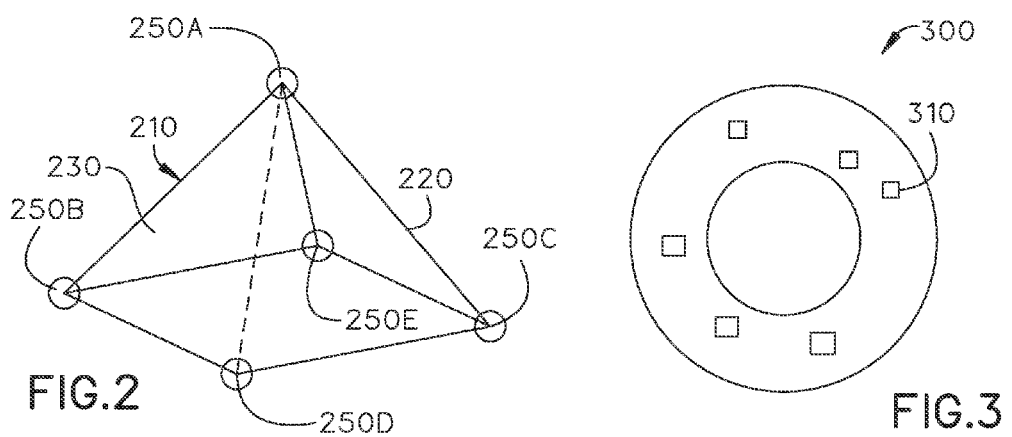

MOBILE DEVICE WIRELESS CHARGING SYSTEM

BACKGROUND

The embodiments herein relate generally to wireless charging for mobile devices.

Mobile devices are becoming more powerful and thus, are requiring more energy to run. The more functions running on a device may consume more battery power. Thus, the need to recharge may increase. In some instances, the device runs out of charge while the user still requires immediate functioning of the device. Typically, charging an electronic device involves plugging the device into a wall outlet and allowing electricity to recharge a battery. The charge time may depend on the battery size but in general, several minutes or hours may be necessary to adequately charge the device. In addition, users typically require access to a wall outlet. However, when away from home, access to wall outlets may be restricted. As may be seen, there is a need to quickly charge a device without necessarily plugging the device into a wall. In addition, there is a need to charge a device quickly to keep the device functioning. Embodiments of the disclosed invention solve these problems.

SUMMARY

In one aspect, a wireless charging system for supplying a stored charge to a mobile device is disclosed. The wireless charging system comprises a receiver in a mobile device configured to receive a wireless signal of an image of an electrically charged, holographic supercapacitor. A storage medium in the mobile device may store the image of the electrically charged, holographic supercapacitor. A trigger mechanism in the mobile device may be configured to release electric charge from the image of the electrically charged, holographic supercapacitor for storage into a battery of the mobile device.

In another aspect, a computer program product for wirelessly charging a mobile device is disclosed. The computer program product comprises a non-transitory computer readable storage medium having computer readable program code embodied therewith, the computer readable program code being configured to: capture an image of an electrically charged, holographic supercapacitor; transfer the image of an electrically charged, holographic supercapacitor wirelessly to a mobile device; translate data in the image of the electrically charged, holographic supercapacitor into an electric charge; and release the electric charge for storage into a battery of the mobile device

BRIEF DESCRIPTION OF THE FIGURES

The detailed description of some embodiments of the invention is made below with reference to the accompanying figures, wherein like numerals represent corresponding parts of the figures.

FIG. 1 is a front view of a mobile device wireless charging system according to an embodiment of the disclosed invention.

FIG. 2 is a perspective view of a supercapacitor for use in the system of FIG. 1 according to an embodiment of the disclosed invention.

FIG. 3 is a top view of a substrate containing supercapacitor circuit chips according to an embodiment of the disclosed invention.

DETAILED DESCRIPTION OF CERTAIN EMBODIMENTS

Figure 4:
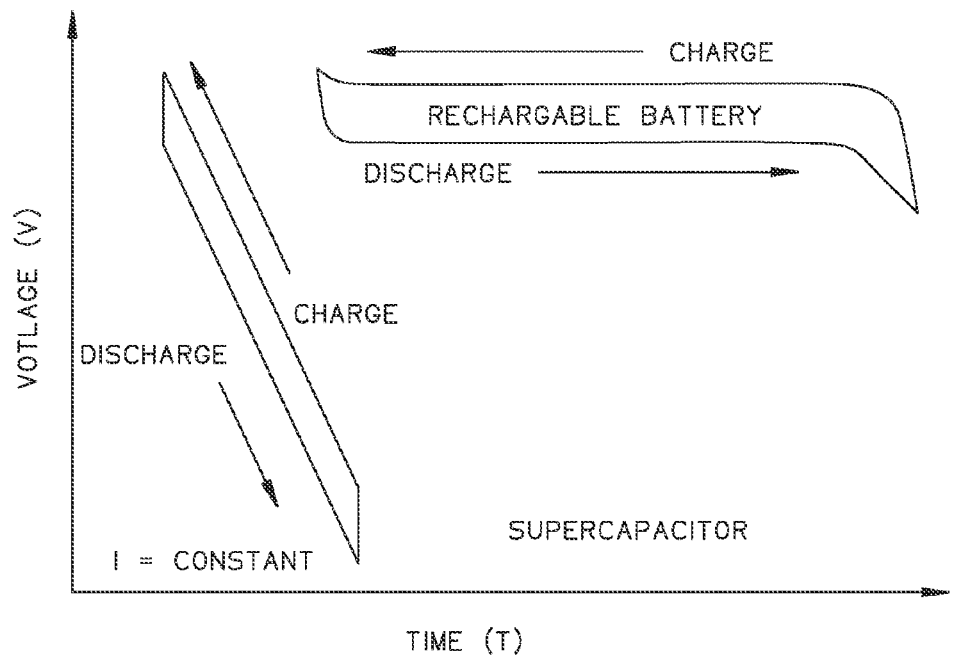
FIG. 4 is a plot showing charge/discharge characteristics of a supercapacitor compared to a rechargeable battery.

In general, embodiments of the present disclosure provide instant recharging of an electronic mobile device. Electric charge may be stored in a holographic image of a supercapacitor. A software application may provide a service for downloading the holographic image of the supercapacitor which may be used to recharge the device. The holographic image may be transmitted wirelessly to the mobile device which may be used to store electric charge subsequently released into the mobile device.

Referring now to FIG. 1, a wireless charging system 99 (referred to generally as the system 99) is shown according to an embodiment of the present disclosure. The system 99 includes a mobile device 100 and a receiver 101 configured to receive wireless signals including an image of an electrically charged, holographic supercapacitor 110. The image of an electrically charged, holographic supercapacitor 110 may store an electric charge (for example, up to about 4V) that may be stored in the mobile device 100. In some embodiments, the image of an electrically charged, holographic supercapacitor 110 may be transmitted wirelessly to the mobile device 100 for instant re-charging of the mobile device 100. The mobile device 100 may include an electronic display 108. The display 108 may provide user interaction with a software application providing access to the charging aspects of the system 99. As shown in FIG. 1, the display 108 is displaying the image of an electrically charged, holographic supercapacitor 110. As discussed below, in some embodiments of the present disclosure, the image of an electrically charged, holographic supercapacitor 110 may be displayed prior to stored charge being released into the mobile device 100. In some embodiments, the mobile device 100 may draw wired electrical charge (through wire 102) from a converter 103 plugged into a wall charger outlet 105 located on a wall 104. The wired electrical charge may be stored in the image of an electrically charged, holographic supercapacitor 110. The electrical charge can be subsequently released into a battery (not shown) of the mobile device 110.

Referring now to FIG. 2, a supercapacitor 210 is shown according to an embodiment of the present disclosure. The image of an electrically charged, holographic supercapacitor 110 (FIG. 1) may be an image of the supercapacitor 210. The supercapacitor 210 may be a graphene based object. In some embodiments, the supercapacitor 210 may be spaser scribed onto a temporary medium, for example, a disc. The supercapacitor 210 may include an aerogel substrate 230. The aerogel substrate 230 may include zinc oxide nanoparticles. The nanoparticles may harvest vibration energy. In some embodiments, the supercapacitor 210 may be a pyramidal shaped structure with graphene walls 220. The supercapacitor 210 may include electrode apexes 250A, 250B, 250C, 250D, and 250E which are electrically connected to the aerogel substrate 230. The graphene walls 220 may form a closed circuit for storing electric charge within the aerogel substrate 230. The structure provided by the graphene walls 220 may be encoded as a software embodiment which may be transferable to the mobile device 100 (FIG. 1) for use as a virtual storage source. The code in the software embodiment may include information that represents the graphene walls 220 and aerogel substrate 230 as a virtual 3-dimensional image, for example, a 5 sided pyramid. Once stored on the mobile device 100 (FIG. 1), the image of the supercapacitor 110 (FIG. 1) may replicate in hologram form the volume and storage capacity of the supercapacitor 210 within the mobile device 100 (FIG. 1). The image of the supercapacitor 110 may store and recover the amplitude and phase of light scattered by the wavefront of light reflected off the supercapacitor 210 as energy information encoded onto the mobile device 100 via a software application. When the voltage is flowing during battery charging of the mobile device 100, the image wavefront of the graphene walls 210 remain thin and no charging of the image of the supercapacitor 110 may occur. Once the battery stops charging, the voltage stops and the walls from the image of the holographic supercapacitor 110 thicken enough to store auxiliary voltage. In one embodiment, the image of an electrically charged, holographic supercapacitor 110 may be decoded to discharge the auxiliary voltage by invoking a trigger function. For example, a vibration source of the mobile device 100 may be triggered. The frequency of the vibrations may break down the wavefronts and thin out the walls to release this saved voltage back into the mobile device 100.

Figure 6:
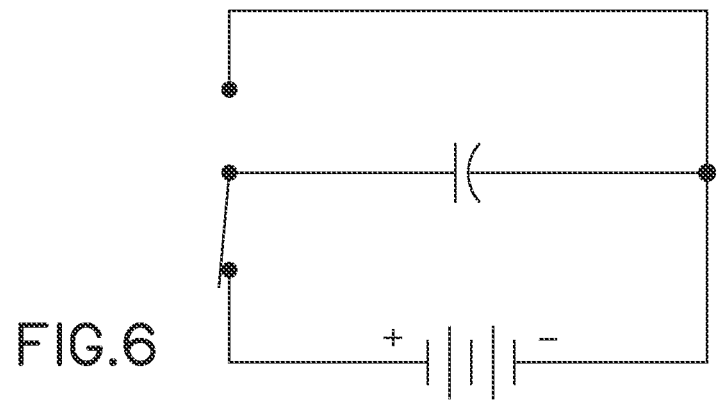
FIG. 6 is a schematic of a circuit with a battery and supercapacitor in a battery charge mode according to an embodiment of the disclosed invention.
Figure 7:
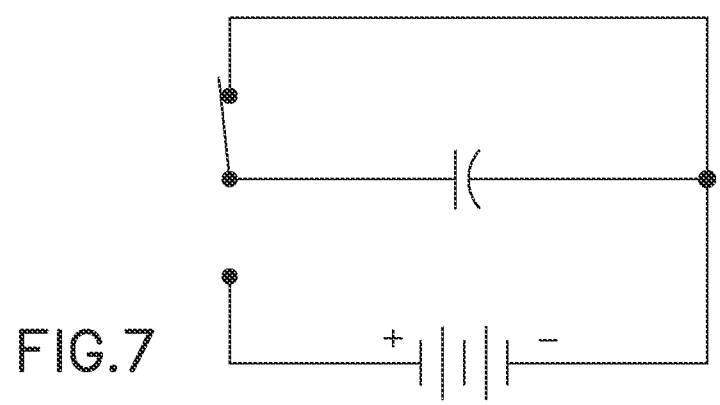
FIG. 7 is a schematic of the circuit of FIG. 6 in a supercapacitor charge mode according to an embodiment of the disclosed invention.

Referring now to FIG. 3, a substrate 300 is shown with a plurality of graphene based supercapacitor circuits 310. The supercapacitor circuits 310 may be holographic images spasered onto the substrate 300. In some embodiments, the supercapacitor circuits 310 may be assembled into the supercapacitors 210 (FIG. 2) storing charge. The supercapacitor circuits 310 may be formed by designing intricate circuit patterns with standard LightScribe software running on a computer with a disc writer. Next, a blank disc covered with a layer of plastic may be painted with a thin film of graphic oxide. The supercapacitor 310 circuit designs may be written onto the graphic oxide using a spaser light beam. In some embodiments, the supercapacitor circuits 310 may be written to form the sides of a pyramidal structure. Exposed areas of the graphic oxide absorb the light and change the graphic oxide into graphene. The graphene may be a one-atom-thick sheet of carbon atoms that efficiently conducts electricity. The graphene layer can be removed from the substrate 300. Each layer of graphene may hold more than 100 supercapacitor circuits 310, which can be cut apart and then integrated with the aerogel substrate 230 (FIG. 2). Once assembled into the holographic pyramidal structure and stored in encoded form, the software application may open the image of one of the holographic graphene walls 220 during battery charging of the mobile device 100 (FIG. 1) (see FIG. 6 representing a circuit during battery charge according to an embodiment of the disclosed invention). The software application may close the image of one of the holographic graphene walls 220 during charging up of the supercapacitor 210 (see FIG. 7 representing a circuit during supercapacitor charge according to an embodiment of the disclosed invention).

Referring now to FIG. 4, a plot of charging/discharging voltage over time is shown. The plot compares charging/discharging of a rechargeable battery to the charging/discharging of a supercapacitor according to embodiments of the present disclosure. As may be appreciated, the supercapacitor has a much steeper charge/discharge time than the rechargeable battery and in comparison, may provide an almost instant charge time. It may be appreciated that the graphene based virtual hologram electrodes 250 (FIG. 2) can fully charge and discharge within 20 seconds and still retain 94% of their nominal charge after 3000 complete charge/discharge cycles. The typical cycle life of a graphene supercapacitor according to embodiments of the disclosed invention can be up to 1 million cycles. In comparison, a typical chemical based battery may only last between 500-1000 cycles.

Figure 5:
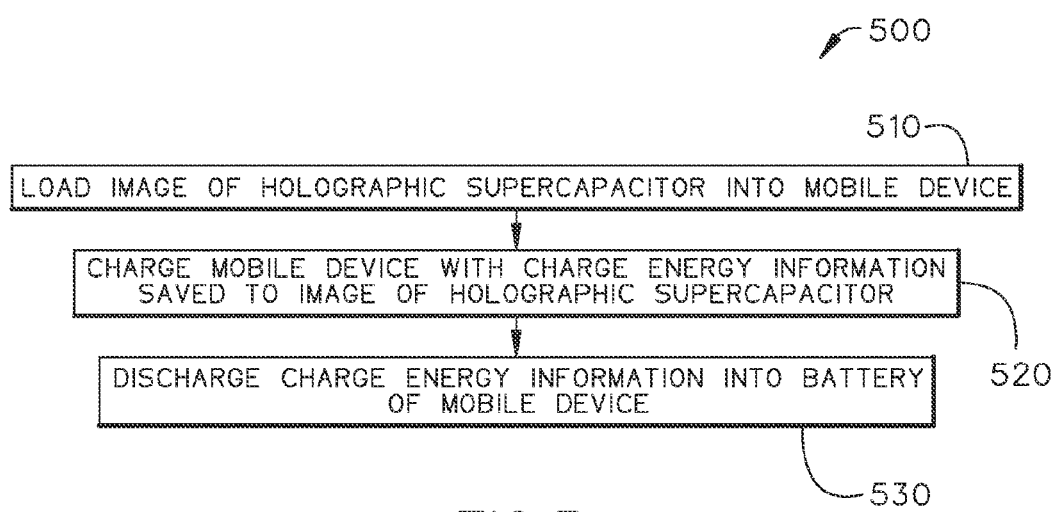
FIG. 5 is a flowchart of a method of charging a mobile device according to an embodiment of the disclosed invention.

Referring to FIG. 5, a method 500 of wirelessly charging a mobile device is shown. In block 510, the image of a holographic supercapacitor may be loaded onto the mobile device. For example, the image of the holographic supercapacitor may be pre-assembled by a source and downloaded onto a user's mobile device. The user, in response to desiring auxiliary charge on the mobile device may, in block 520, charge the mobile device using charge energy information saved in the image of the holographic supercapacitor. For example, in some embodiments, a battery of the mobile device may be plugged in to a wall charger and once the battery's storage capacity is filled, a processor in the mobile device, via a software application, may control the mobile device to divert and store additional charge from the wall charger into the image of the holographic supercapacitor. Once the mobile device is unplugged from the wall charger or the image of a holographic supercapacitor reaches capacity, the processor via the software application, may stop charging the image of a holographic supercapacitor. In response to the mobile device battery needing electric charge, for example, due to depletion of charge in the battery of the mobile device, in block 530, a trigger may discharge the energy information from the image of the holographic supercapacitor into the battery of the mobile device. In some embodiments, the trigger may be a user controlled feature. For example, the vibration source in a mobile phone may be activated to invoke the discharge of electrical charge from the image of the holographic supercapacitor. In some embodiments, the vibration source may be configured to operate at a frequency which breaks down one or more walls in the supercapacitor to release charge. For example, in a pyramidal shaped supercapacitor with an aerogel substrate, the walls may function as a gate such that charge is stored within the walls in a closed circuit. The vibration frequency may resonate destructively with the apexes of the supercapacitor such that a wall(s) opens and the "circuit" is opened releasing the stored charge along a line (not shown) connected to the device's battery (not shown).

It will be understood that embodiments of the present disclosure may use the form of a software application which may be stored, for example, on the mobile device 100. The mobile device 100 may be configured to run the software application which may execute the functions necessary to upload the supercapacitor and its image onto the mobile device 100 and subsequently coordinate charge of the mobile device 100 as described above. While the above has been described primarily in the context of a mobile phone (as shown in FIG. 1), it will be understood that other electronic devices may be charged up according to the embodiments described above. The following discloses embodiments of computer based elements and functions which may run embodiments in the form of a software application.

Figure 8:
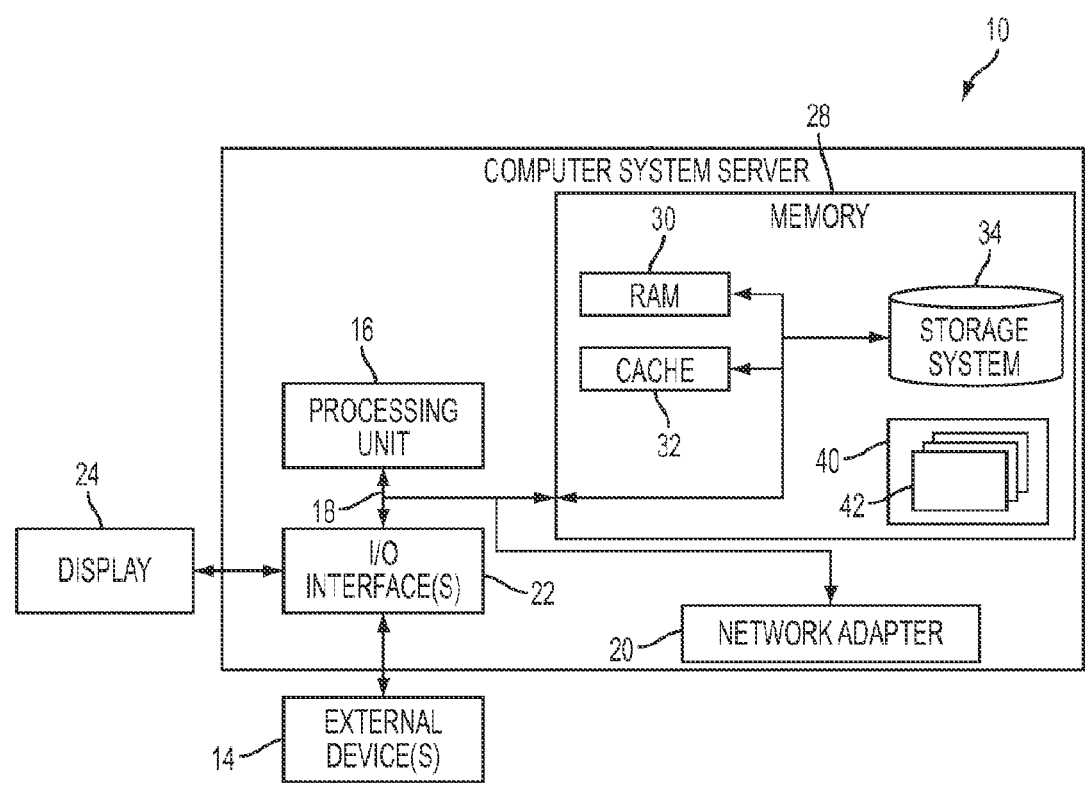
FIG. 8 is a block diagram of a computer system/server according to an embodiment of the disclosed invention.

Referring now to FIG. 8, a schematic of an example of a computer system 10 is shown. The computer system 10 is shown in the form of a general-purpose computing device. In some embodiments, the mobile device 100 (FIG. 1) may function in the form of the computer system 10. The components of the computer system 10 may include, but are not limited to, one or more processors or processing units 16, a system memory 28, and a bus 18 that couples various system components including the system memory 28 to the processor 16. In some embodiments, the computer system 10 may be for example, personal computer systems, tablet devices, mobile telephone devices, server computer systems, handheld or laptop devices, multiprocessor systems, microprocessor-based systems, set top boxes, programmable consumer electronics, and network PCs.

The computer system 10 may typically include a variety of computer system readable media. Such media could be chosen from any available media that is accessible by the computer system 10, including non-transitory, volatile and non-volatile media, removable and non-removable media. The system memory 28 could include a random access memory (RAM) 30 and/or a cache memory 32. By way of example only, a storage system 34 can be provided for reading from and writing to a non-removable, non-volatile magnetic media device. The system memory 28 may include at least one program product 40 having a set (e.g., at least one) of program modules 42 that are configured to carry out the functions of embodiments of the invention. The program product 40, having a set (at least one) of program modules 42, may be stored in the system memory 28. The program modules 42 generally carry out the functions and/or methodologies of embodiments of the invention as described herein.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects. Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The image of an electrically charged, holographic supercapacitor 110 (FIG. 1) may be stored in the computer readable media and read therefrom for display and interaction with.

Aspects of the disclosed invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions provided to the processor 16 to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A wireless charging system for supplying a stored charge to a mobile device, comprising:
    a receiver in a mobile device configured to receive a wireless signal of an image of an electrically charged, holographic supercapacitor;
    a storage medium in the mobile device for storing the image of the electrically charged, holographic supercapacitor; and
    a trigger mechanism in the mobile device configured to release electric charge from the image of the electrically charged, holographic supercapacitor for storage into a battery of the mobile device.

2. The wireless charging system of claim 1, wherein the trigger mechanism includes a computer program product with computer readable code configured to translate data in the image of the electrically charged, holographic supercapacitor into an electric charge.

3. The wireless charging system of claim 1, wherein the image of the electrically charged, holographic supercapacitor is of a graphene based object.

4. The wireless charging system of claim 3, wherein the graphene based object is pyramidal shaped graphene structure.

5. The wireless charging system of claim 4, wherein the pyramidal shaped graphene structure is coupled to an aerogel based circuit substrate.

6. A computer program product for wirelessly charging a mobile device, the computer program product comprising a non-transitory computer readable storage medium having computer readable program code embodied therewith, the computer readable program code being configured to:
    capture an image of an electrically charged, holographic supercapacitor;
    transfer the image of an electrically charged, holographic supercapacitor wirelessly to a mobile device;
    translate data in the image of the electrically charged, holographic supercapacitor into an electric charge; and
    release the electric charge for storage into a battery of the mobile device.

7. The computer program product for wirelessly charging a mobile device of claim 6, the computer readable program code being configured to:
    store the image of the electrically charged, holographic supercapacitor; and
    release the electric charge upon activation of a user controlled trigger.

8. The computer program product for wirelessly charging a mobile device of claim 7, wherein the user controlled trigger is activation of a vibration mechanism of the mobile device.

9. The computer program product for wirelessly charging a mobile device of claim 6, wherein the captured image of the electrically charged, holographic supercapacitor is of a graphene based object.

10. The computer program product for wirelessly charging a mobile device of claim 6, wherein the electrically charged, holographic supercapacitor comprises an aerogel storing charge.

* * * * *